US012144342B2

(12) United States Patent
Machado et al.

(10) Patent No.: US 12,144,342 B2
(45) Date of Patent: Nov. 19, 2024

(54) OIL LIQUID FUNGICIDAL FORMULATION

(71) Applicant: Adama Makhteshim Ltd., Beer-Sheva (IL)

(72) Inventors: Silvio Luiz Machado, Londrina (BR); Ernesto Benetti, Londrina (BR); Luiz Fernando Colla, Londrina (BR)

(73) Assignee: ADAMA MAKHTESHIM LTD., Beer Sheva (IL)

( * ) Notice: Subject to any disclaimer, the term of this patent is extended or adjusted under 35 U.S.C. 154(b) by 92 days.

(21) Appl. No.: 16/302,882

(22) PCT Filed: May 24, 2017

(86) PCT No.: PCT/IL2017/050576
§ 371 (c)(1),
(2) Date: Nov. 19, 2018

(87) PCT Pub. No.: WO2018/049088
PCT Pub. Date: Mar. 15, 2018

(65) Prior Publication Data
US 2019/0150430 A1    May 23, 2019

Related U.S. Application Data

(60) Provisional application No. 62/456,175, filed on Feb. 8, 2017, provisional application No. 62/340,610, filed on May 24, 2016.

(51) Int. Cl.
| *A01N 25/04* | (2006.01) |
| *A01N 25/02* | (2006.01) |
| *A01N 43/40* | (2006.01) |
| *A01N 43/653* | (2006.01) |
| *A01N 47/14* | (2006.01) |
| *A01P 3/00* | (2006.01) |

(52) U.S. Cl.
CPC ............. *A01N 25/04* (2013.01); *A01N 25/02* (2013.01); *A01N 43/40* (2013.01); *A01N 43/653* (2013.01); *A01N 47/14* (2013.01); *A01P 3/00* (2021.08)

(58) Field of Classification Search
CPC ........ A01N 25/04; A01N 25/02; A01N 43/40; A01N 43/653; A01N 47/14; A01P 3/00
See application file for complete search history.

(56) References Cited

U.S. PATENT DOCUMENTS

| 4,886,825 | A | 12/1989 | Ruess |
| 5,078,782 | A * | 1/1992 | Nielsen .................. A01N 25/04 424/405 |
| 5,599,768 | A | 2/1997 | Hermansky |
| 10,362,782 | B2 | 7/2019 | Oliveira |
| 2004/0077501 | A1* | 4/2004 | Stewart .................. A01N 39/04 504/358 |
| 2005/0032903 | A1 | 2/2005 | Suarez-Cervieri et al. |
| 2005/0085389 | A1 | 4/2005 | Forster |
| 2007/0135506 | A1* | 6/2007 | Zeun ..................... A01N 37/46 514/408 |
| 2009/0048319 | A1* | 2/2009 | Kohle ..................... C05G 3/60 514/383 |
| 2010/0190648 | A1 | 7/2010 | Tollington et al. |
| 2012/0157310 | A1* | 6/2012 | Rochling ............... A01N 43/56 514/383 |
| 2016/0088835 | A1 | 3/2016 | Castelani |

FOREIGN PATENT DOCUMENTS

| AU | 2006201613 A1 | 11/2007 |
| CN | 101849546 | 6/2010 |
| CN | 102258039 | 11/2011 |
| CN | 103907621 A | 7/2014 |
| CN | 103947650 | 7/2014 |
| CN | 104247712 A | 12/2014 |
| CN | 104585181 A | 5/2015 |
| EP | 0 149 459 A2 | 7/1985 |
| EP | 0697171 A1 | 2/1996 |
| GB | 2 067 407 A | 7/1981 |
| IN | 1777/CHE/2014 | 4/2014 |
| WO | WO 2002/45507 | 6/2002 |
| WO | WO 2008/031512 A1 | 3/2008 |
| WO | WO 2008/035854 A1 | 3/2008 |
| WO | WO 2009/004281 A3 | 1/2009 |
| WO | WO 2009/102753 A2 | 8/2009 |
| WO | WO 2010/0190648 A1 | 7/2010 |
| WO | WO 2010/099965 A2 | 9/2010 |

(Continued)

OTHER PUBLICATIONS

J. Pucci, "Adjuvants: Croda Launches New Polysorbates," <https://www.agribusinessglobal.com/agrochemicals/adjuvants-croda-launches-new-polysorbates/>, published Mar. 6, 2014, pp. 1-2.*

Office Action No. 783 issued on Jan. 22, 2020 in connection with Colombian Application No. NC2018/0013854 (including English translation).

Response to Office Action No. 783 filed on Apr. 28, 2020 in connection with Colombian Application No. NC2018/0013854.

Office Action issued on Aug. 11, 2020 in connection with Ukrainian Application No. a 2018 11501 (including English translation).

Response to Aug. 11, 2020 Office Action filed in connection with Ukrainian Application No. a 2018 11501.

(Continued)

*Primary Examiner* — Scarlett Y Goon
*Assistant Examiner* — Andriae M Holt
(74) *Attorney, Agent, or Firm* — Gary J. Gershik

(57) ABSTRACT

A fungicidal oil liquid formulation comprising: a) at least one dithiocarbamate fungicide; b) at least one co-fungicide selected from the group consisting of triazole fungicides and strobilurin fungicides; and c) an agrochemically acceptable non-aqueous liquid carrier; wherein the dithiocarbamate fungicide is suspended in the liquid carrier; wherein the triazole fungicide and the strobilurin fungicide are dissolved in the liquid carrier; and wherein the liquid carrier optionally comprises an adjuvant.

28 Claims, 7 Drawing Sheets

(56) References Cited

FOREIGN PATENT DOCUMENTS

Figure 1:
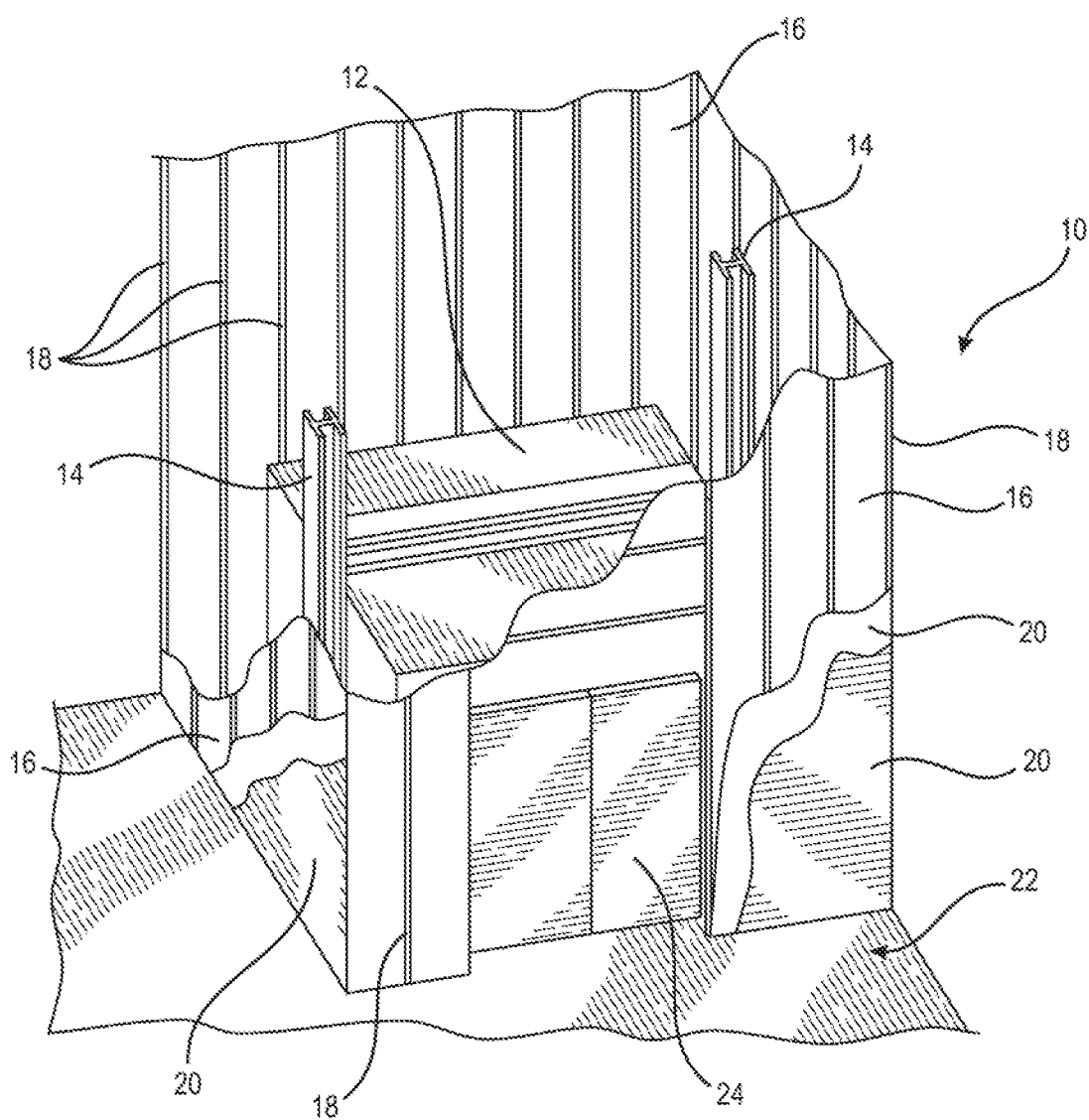
Figure 2:
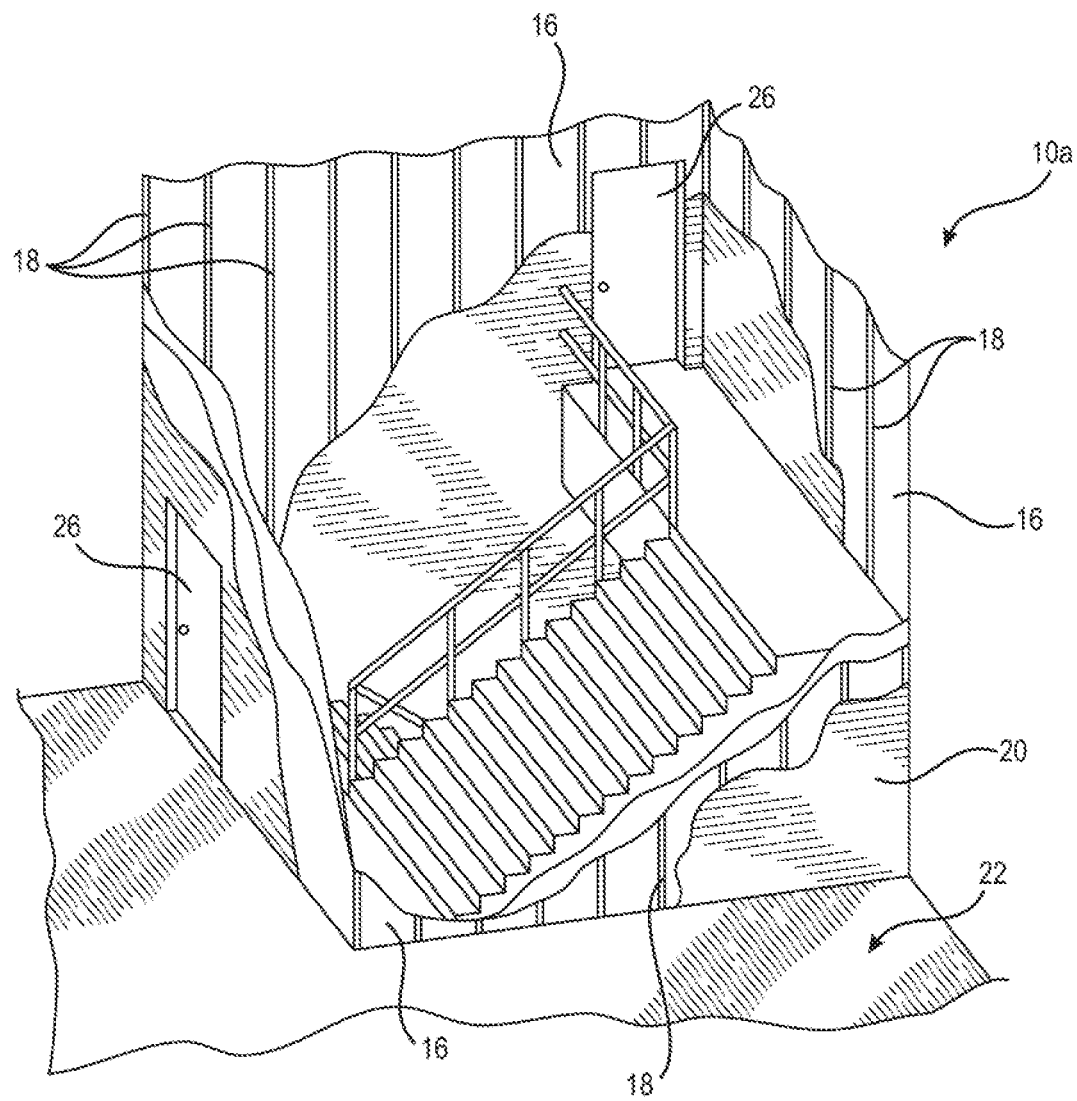
Figure 3:
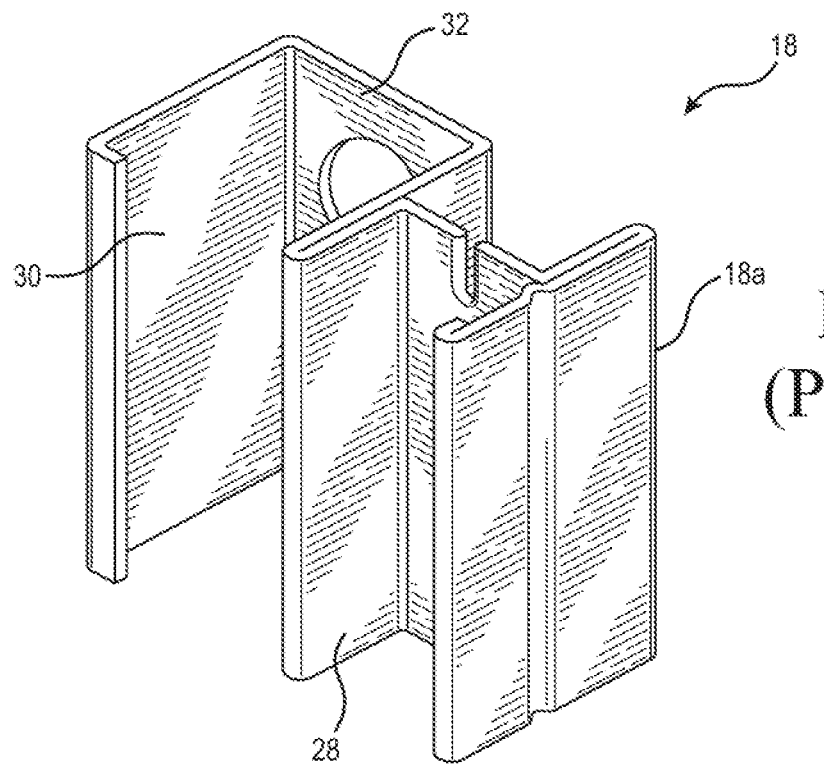
Figure 4:
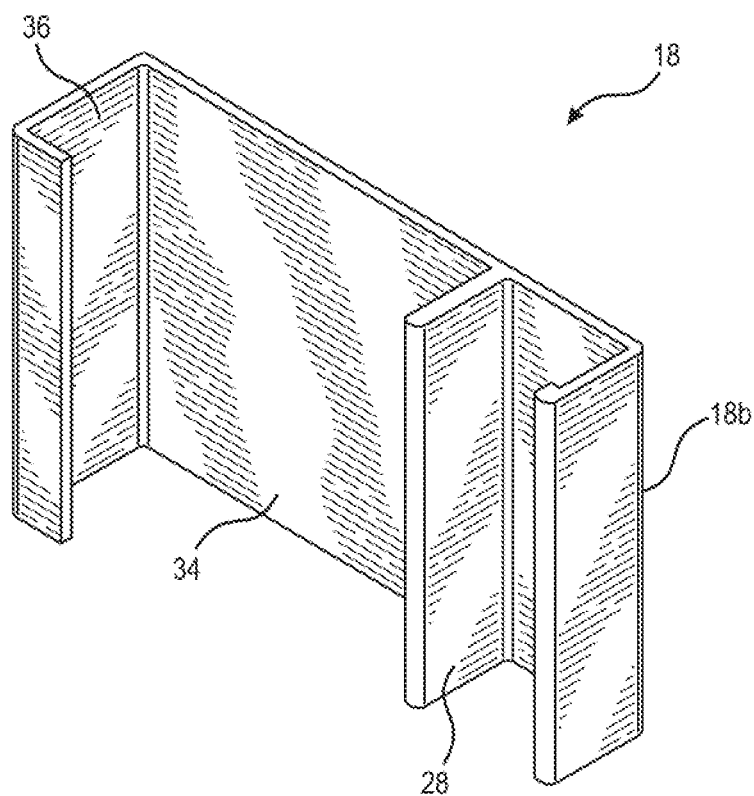
Figure 5:
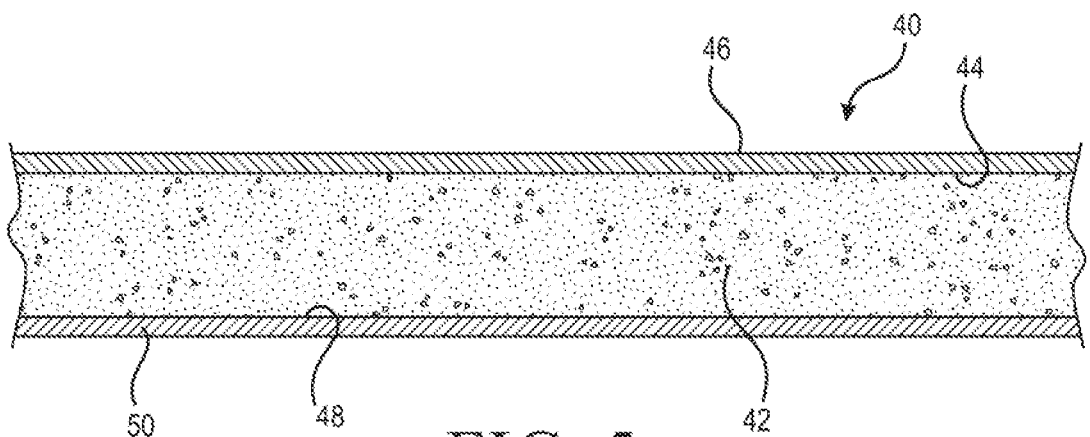
Figure 6:
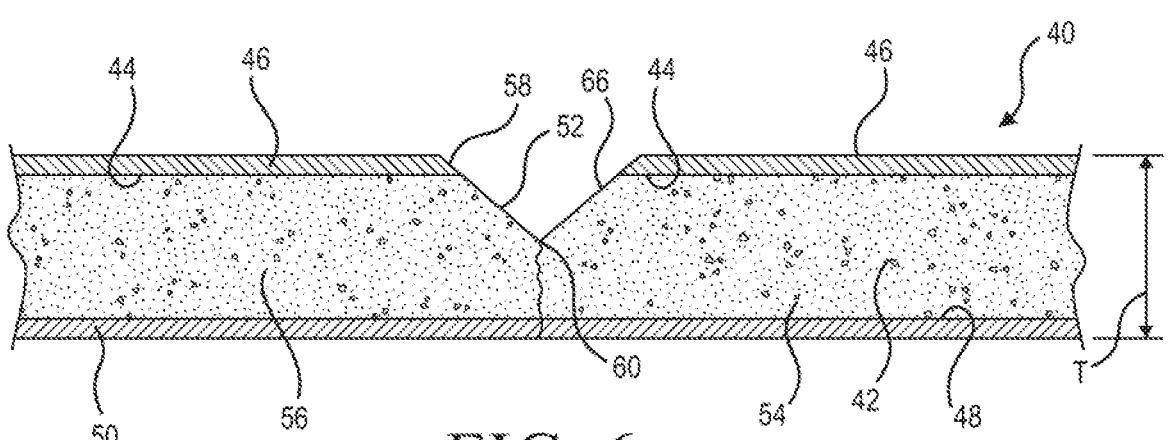
Figure 7:
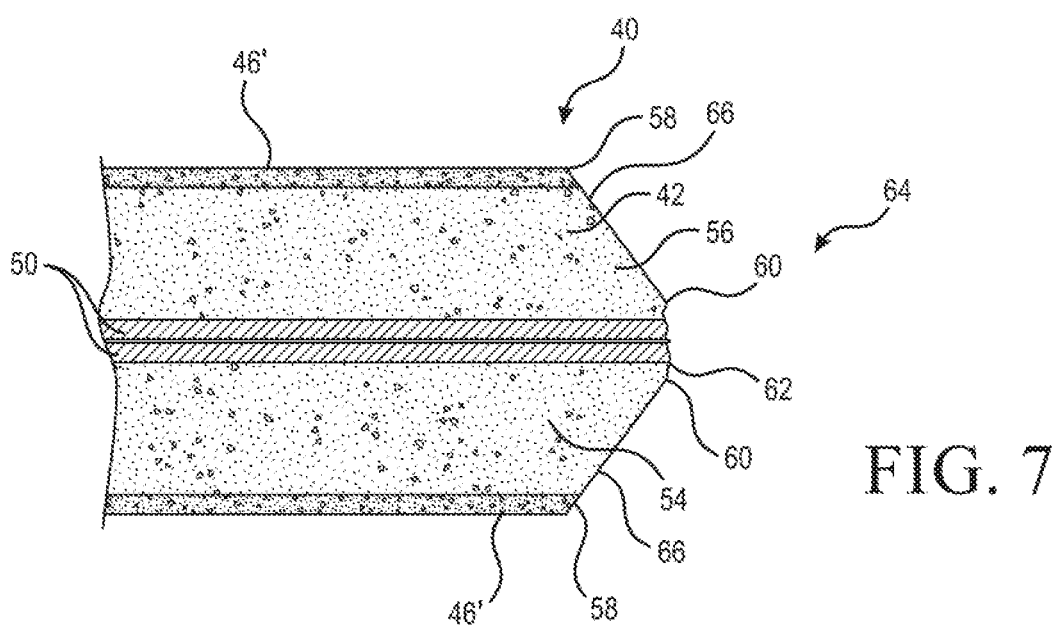
Figure 8:
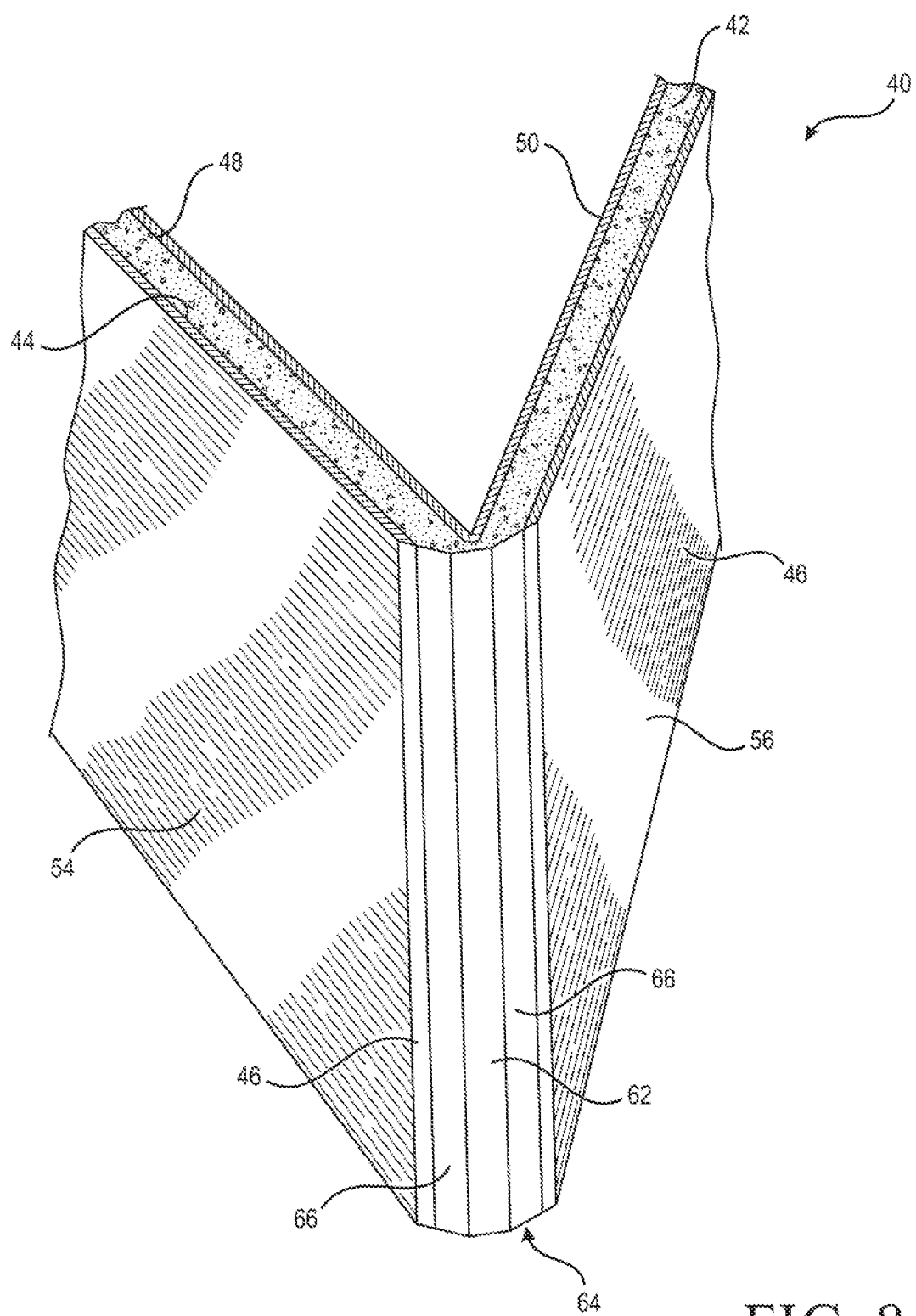
Figure 9:
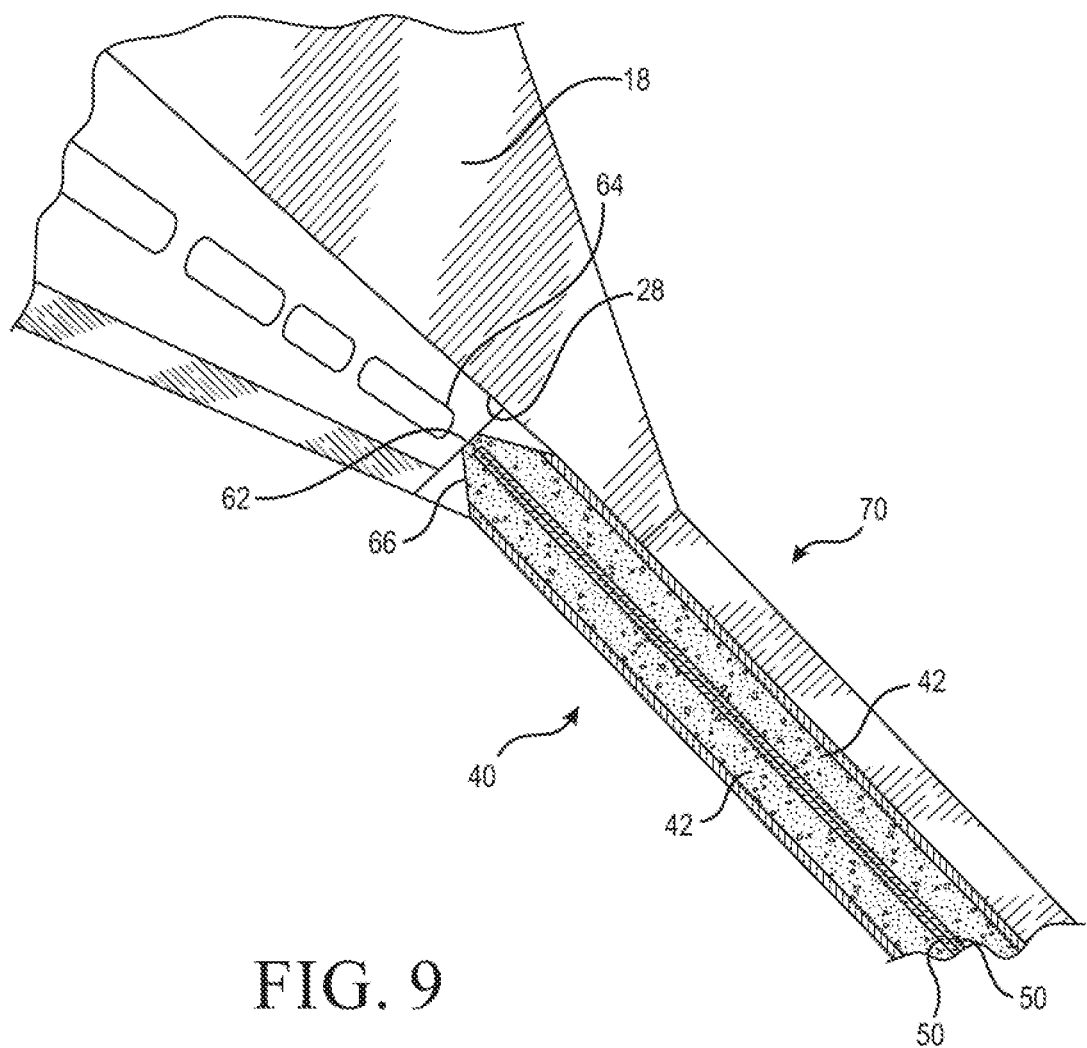
Figure 10:
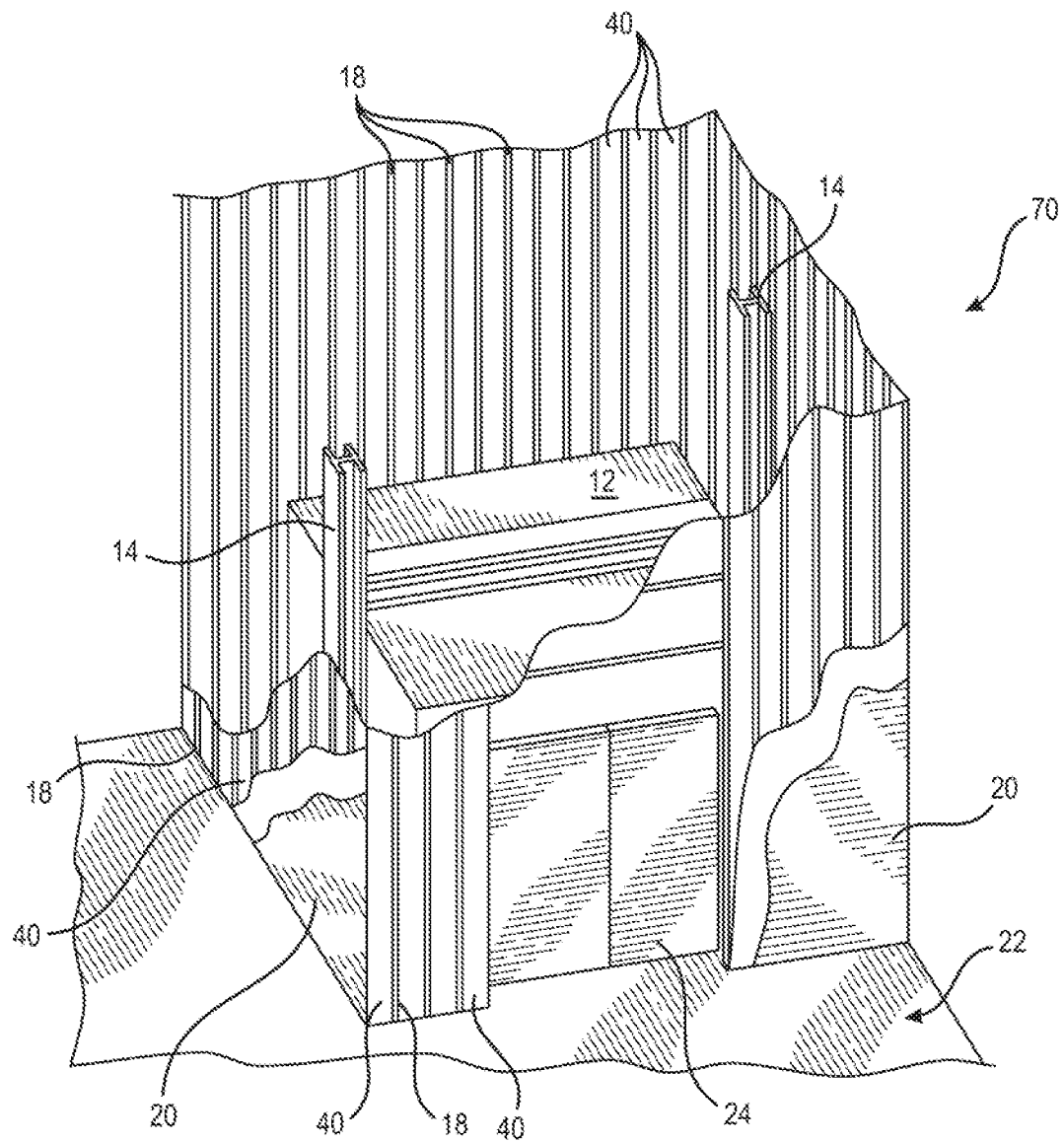

| WO | WO 2012/016972 A2 | 2/2012 |
|---|---|---|
| WO | WO 2012/080208 A1 | 6/2012 |
| WO | WO 2012/108873 A1 | 8/2012 |
| WO | WO 2012/167321 A1 | 12/2012 |
| WO | WO 2012/167322 A1 | 12/2012 |
| WO | WO 2014/169363 A1 | 10/2014 |
| WO | WO 2015/079334 A1 | 6/2015 |
| WO | WO 2015/079334 A8 | 6/2015 |
| WO | WO 2015/083017 A1 | 6/2015 |
| WO | WO 2015/139564 A1 | 9/2015 |
| WO | WO 2016/0088835 A1 | 3/2016 |
| WO | WO 2017/203527 A1 | 11/2017 |
| WO | WO 2018/083577 A1 | 5/2018 |

OTHER PUBLICATIONS

First Examination Report issued on Jul. 3, 2020 in connection with Indian Application No. 201817043773.
Pre-Grant Opposition filed on Aug. 12, 2020 in connection with Indian Application No. 201817043773.
Third Party Observation submitted on Sep. 21, 2018 in connection with PCT International Application No. PCT/IL2017/050576.
Response to Third Party Observation filed on Nov. 19, 2018 in connection with PCT International Application No. PCT/IL2017/050576.
International Preliminary Report on Patentability issued Nov. 27, 2018 in connection with PCT International Application No. PCT/IL2017/050576.
Third Party Observation by an anonymous party to the World Intellectual Property Organization WIPO), published Sep. 25, 2018 in connection with PCT Application No. PCT/IL2017/050576.
Additional Comments Submitted with Observation by an anonymous party to the WIPO, published Sep. 25, 2018 in connection with PCT Application No. PCT/IL2017/050576.
Applicant Comments on Third Party Observation published Nov. 22, 2018 in connection with PCT Application No. PCT/IL2017/050576.
International Preliminary Report on Patentability Chapter I in connection with PCT Application No. PCT/IL2017/050576.
International Search Report in connection with PCT International Application No. PCT/IL2017/050576.
Written Opinion of the International Searching Authority in connection with the PCT International Application No. PCT/IL2017/050576.
Office Action issued on Dec. 4, 2020 in connection with Ukrainian Application No. a 2018 11501 (including English translation).
Response to Dec. 4, 2020 Office Action filed in connection with Ukrainian Application No. a 2018 11501.
First Office Action issued on Dec. 11, 2020 in connection with Chinese Application No. 2017800317757 (including English Summary).
Office Action No. 2364 issued on Feb. 23, 2021 in connection with Colombian Application No. NC2018/0013854.
Written Opinion of the International Searching Authority issued Nov. 26, 2020 in connection with PCT International Application No. PCT/IB2020/058268, filed Sep. 4, 2020.
PCT International Search Report issued Mar. 11, 2021 in connection with PCT International Application No. PCT/IB2020/058268, filed Sep. 4, 2020.
"Protective fungicides in the management of soybean rust, physiological process and crop productivity", Viviane Moreira Alves, Apr. 26, 2016 (98p—illustrated).
Jul. 10, 2022 Third-Party Opinion #4 filed in connection with corresponding Brazilian Patent Application No. BR 102017010745-0.
Oct. 12, 2022 Office Action issued in connection with corresponding Mexican Patent Application No. MX/a/2018/014504, including English translation.
Sep. 21, 2022 Office Action issued in connection with corresponding Brazilian Patent Application No. BR 102017010745-0.

Hua, Nai-zhen. "Progress, Process, and Application of Pesticide OD(I)." *Modern Agrochemicals*, 13(3): 175-178 (Jun. 2014).
Oct. 14, 2022 Third-Party Submission submitted in connection with U.S. Appl. No. 17/727,234.
Oct. 4, 2022 Third-Party Assertion submitted in connection with corresponding New Zealand Patent Application No. 529198NZ.
Sep. 21, 2022 Third-Party Submission submitted in connection with corresponding Australian Patent Application No. AU 2021282407.
Aug. 8, 2022 English translation of Third-Party Opinion #5 filed in connection with corresponding Brazilian Patent Application No. BR 10220170010745-0.
Aug. 6, 2022 Third Office Action issued in connection with corresponding Chinese Patent Application No. CN 201780031775.7, including English translation.
Oct. 24, 2022 Response to Third Office Action filed in connection with corresponding Chinese Patent Application No. CN 201780031775.7, including English translation.
May 10, 2021 Pre-Grant Opposition filed in connection with corresponding Indian Patent Application No. IN2017817043773.
Jan. 12, 2022 Third-Party Opinion #2 filed in connection with Brazilian Patent Application No. 102017010745-0.
PCT International Search Report issued Mar. 11, 2021 in connection with PCT International Application No. PCT/IB2020/058268 (WO 2021/044371), filed Sep. 4, 2020.
Written Opinion of the International Searching Authority issued Mar. 11, 2021 in connection with PCT International Application No. PCT/IB2020/058268 (WO 2021/044371), filed Sep. 4, 2020.
International Preliminary Report on Patentability issued Mar. 11, 2021 in connection with PCT International Application No. PCT/IB2020/058268 (WO 2021/044371), filed Sep. 4, 2020.
Jan. 12, 2022 Third-Party Opinion #2 filed in connection with Brazilian Patent Application No. 102017010745-0 (Exhibit 2).
Jan. 12, 2022 Third-Party Opinion #3 filed in connection with Brazilian Patent Application No. 102017010745-0 (Exhibit 3).
Decision to Grant issued for Colombia Application No. NC2018/0013854, with an English machine translation of last paragraph on p. 16 and p. 17.
Notice of Allowance issued Jun. 5, 2023 by the Ukrainian Patent Office Action in connection with Ukrainian Application No. a201811501, along with an English Summary of the Notice of Allowance.
Notice of Allowance issued Jun. 13, 2023 by the Chinese Patent Office Action in connection with Chinese Application No. 201780031775,7, along with an English Summary of the Notice of Allowance.
Office Action dated Oct. 24, 2022 issued in Colombian Patent Application No. NC2022/0014888 and its English summary.
Alves PhD thesis, English version of Alves, V.M., 2016, "Protective Fungicides in the Management of Soybean Rust, Physiological Processes and Crop Productivity," Dissertation (Master's degree in Agronomy/Phytopathology), Universidade Federal de Uberlandia.
Decision of Rejection dated Oct. 31, 2022 issued in Colombian Patent Application No. NC2018/0013854 and its English summary.
Rejection Decision dated Jan. 5, 2023 issued in Chinese Patent Application No. 201780031775.7 and its English summary.
English summary of Office Action dated Nov. 2, 2022 issued in Argentinian Patent Application No. 20170101399.
Third Party Opposition filed Feb. 23, 2023 in connection with Brazilian Patent Application No. BR 10 2017 010745 0 and its English translation.
Office Action dated Feb. 10, 2023 issued in Australian Patent Application No. 2021282407.
Third Party Opposition filed Mar. 16, 2023 in connection with Brazilian Patent Application No. BR 10 2017 010745 0 and its English translation.
"Guidance Document for the Generation and Evaluation of Data on the Physical, Chemical and Technical Properties of Plant Protection Products Under Regulation (EC) No. 1107/2009," SANCO/10473/2003—rev. 5, Oct. 21, 2021, 97 pages.
Third Party Opposition filed Mar. 28, 2023 in connection with Ukrainian Patent Application No. a 2018 11501 and its English translation.
Office Action dated Mar. 29, 2023 issued in Israeli Patent Application No. 267061 and its English translation.

(56) References Cited

OTHER PUBLICATIONS

Rejection Decision dated Mar. 30, 2023 issued in Brazilian Patent Application No. 10 2017 010745 0 and its English summary.
Office Action dated Apr. 27, 2023 issued in Argentine Patent Application No. 20170101399 with English language machine translation summary.
Feb. 10, 2023 Examination Report issued in connection with counterpart Australian Application No. 2021282407.
Decision of Rejection issued in connection with counterpart Colombian Application No. NC2022/0018351 and English Machine Translation thereof.
Apr. 27, 2023 Office Action issued in connection with counterpart Argentinian Application No. 20170101399 and English Machine Translation thereof.
Counterarguments in the names of C&S InterPatents submitted against counterpart Brazilian Application No. BR 10 2017 010745 0 and its English Translation thereof.
Cultivar Magazine cited in the counterarguments in the names of C&S InterPatents submitted against counterpart Brazilian Application No. BR 10 2017 010745 0 and its English Translation thereof.
Third-party opinion submitted against counterpart Brazilian Application No. BR BR 12 2022 025924 3 and its English Translation thereof.
Office Action issued in connection with counterpart Colombian Application No. NC2023/0009776 and its English Translation.
Office Action issued in connection with counterpart Mexican Application No. MX/a/2018/014504 and its English Translation.
Oct. 12, 2023 Office Action issued in connection with counterpart Argentinian Application No. 20170101399 and English Machine Translation thereof.
Jun. 22, 2023 Office Action issued in connection with counterpart Canadian Application No. 3,024,823.
Dipak Kumar Hazra, "Recent Advancement in Pesticide Formulations for User and Environment Friendly Pest Management", IJRR, vol. 2; Issue: 2; Feb. 2015.
Pucci, J., "Ajuvants: Croda Launches New Polysorbates," AgriBusiness Global online magazine, article posted online Mar. 6, 2014.
Decision to grant for counterpart Colombian Patent Application No. NC2023/0009776 and English Machine Translation thereof (Exhibit 2).
Decision to grant for counterpart Colombian Patent Application No. NC2018/0013854 (Exhibit 3).
Publish of grant for counterpart South African Application No. 2018/07315 (Exhibit 4).
Apr. 8, 2024 Pre-grant opposition submitted by Mr. Mohammad Yunus in connection with counterpart Indian application No. 201817043773 (Exhibit 5).
BRPTO's rejection decision issued for counterpart Brazilian Application No. BR 12 2022 025931 6 and English translation thereof (Exhibit 6).
BRPTO's rejection decision issued for counterpart Brazilian Application No. BR 12 2022 025937 5 and English translation thereof (Exhibit 7).
BRPTO's rejection decision issued for counterpart Brazilian Application No. BR 12 2022 025939 1 and English translation thereof (Exhibit 8).
BRPTO's rejection decision issued for counterpart Brazilian Application No. BR 12 2022 025951 0 and English translation thereof (Exhibit 9).
BRPTO's rejection decision issued for counterpart Brazilian Application No. BR 12 2022 025950 2 and English translation thereof (Exhibit 10).
BRPTO's rejection decision issued for counterpart Brazilian Application No. BR 12 2022 025959 6 and English translation thereof (Exhibit 11).
BRPTO's rejection decision issued for counterpart Brazilian Application No. BR 12 2022 025967 7 and English translation thereof (Exhibit 12).
BRPTO's rejection decision issued for counterpart Brazilian Application No. BR 12 2022 025962 6 and English translation thereof (Exhibit 13).
BRPTO's rejection decision issued for counterpart Brazilian Application No. BR 12 2022 025974 0 and English translation thereof (Exhibit 14).
BRPTO's rejection decision issued for counterpart Brazilian Application No. BR 12 2022 025976 6 and English translation thereof (Exhibit 15).
English version of BRPTO's non-final Office Action issued for BR 12 2022 025959 6 (Exhibit 16).
English version of BRPTO's non-final Office Action issued for BR 12 2022 025962 6 (Exhibit 17).
English version of BRPTO's non-final Office Action issued for BR 12 2022 025967 7 (Exhibit 18).
English version of BRPTO's non-final Office Action issued for BR 12 2022 025976 6 (Exhibit 19).
May 15, 2023 Office Action issued by the Colombian Patent Office in connection with counterpart Colombian Appln. No. NC2022/0018351 and English machine translation thereof (Exhibit 20).
May 12, 2023 Office Action issued by the Mexican Patent Office in connection with counterpart Mexican Appln. No. MX/a/2018/014504 and English machine translation thereof (Exhibit 21).
BRPTO's rejection decision issued for counterpart Brazilian Application No. BR 12 2022 025924 3 and English translation thereof (Exhibit 22).

* cited by examiner

OIL LIQUID FUNGICIDAL FORMULATION

CROSS-REFERENCE TO RELATED APPLICATIONS

This application is a §371 national stage of PCT International Application No. PCT/IL2017/050576, filed May 24, 2017, claiming priority of U.S. Provisional Application Nos. 62/456,175, filed Feb. 8, 2017, and 62/340,610, filed May 24, 2016, the contents of each of which are hereby incorporated by reference into the application.

TECHNICAL FIELD

The present subject matter relates to pesticidal compositions for use in agricultural pest control applications. In particular, this subject matter provides a stable fungicidal oil liquid formulation comprising at least one dithiocarbamate fungicide, suspended in a non-aqueous liquid carrier; and at least one triazole fungicide and at least one strobilurin fungicide, dissolved in the non-aqueous liquid currier.

BACKGROUND

Dithiocarbamates are generally known to have effective fungicidal activity. However, a particular problem of these active ingredients is their relatively high instability. This is caused by the low stability of the C—S bonds and of the thiocarbamate function, in particular at low pH values and in the presence of nucleophilic agents.

These active ingredients may be formulated as solid formulations in order to improve their stability. Solid powder formulations which are known are, for example, Manzate 75 WG (product of DuPont), Polyram DF (product of Nufarm) and Vondozeb 75 WG (product of Agrosimex). However, there are known disadvantages with solid formulations such as water dispersible granules. Some of these may include poor dispersion in water, difficulties in measuring dosages, compatibility with other components in tank mix and the high cost to manufacture such formulations.

In many cases, liquid products are preferred nowadays to the abovementioned solid formulations. The liquid products have the advantage that they show good miscibility, even under ULV (ultra-low volume) conditions, with oil-based tank-mix additives, in a water/oil formulations or oil formulations (see EP0435760 and EP0697171).

Agrochemical oil dispersions (OD) are stable suspensions of agrochemical active ingredients, such as pesticides and crop protection chemicals, in non-aqueous fluids, which may contain other dissolved active ingredients. Oil dispersions are particularly useful for formulating oil insoluble solid active ingredients.

Oil dispersion formulations are a concentrate which is diluted with water before use to produce an aqueous composition which is used in crop protection. In order to enable dispersion in water, such formulation contain emulsifies, dispersants and further formulation components such as thickeners, antifoaming agents and solid carriers. Oil dispersions are often chosen if the active ingredient is sensitive to water or if the oil is required to act as an adjuvant in order to improve biological performance of the pesticide. Oil dispersions are usually free of water. This is either to prevent degradation of active ingredients and to prevent phase separation of the formulation.

Oil dispersion formulations provide certain advantages to the farmer. Active ingredients which are usually unstable in water may now be formulated in solid suspended form. Oil-based adjuvants may also be combined with these types of formulations in order to enhance efficacy. Further, suspension of active ingredients in non-aqueous liquid carrier can possibly lead to higher active ingredient strength formulations than would otherwise be possible. This is because active ingredients have a solubility limit on the amount that can be added into a formulation.

A disadvantage of the existing oil dispersion formulations is that such formulations frequently show phase separation after storage. Thus, storage even at ambient temperatures leads to aggregation effects, lump formation or pronounced settling off the suspended phase. Depending on the density of the active ingredient and of the non-aqueous liquid carrier used, it is also possible for the active ingredient particles to separate from the non-aqueous liquid carrier. In some cases, the effects are irreversible.

A common method to solve this problem is to add to the oil dispersion formulations, anti-settling agents. These may include a thickener that increases the viscosity of the system and acts as suspending agent by reducing the settling rate of the particles.

As described in WO 2009/004281, typical thickeners for physically stable oil dispersion include organoclays such as smectite, hectorite or montmorillonite clays which are organophilic and therefore compatible with non-aqueous formulations. The use of these thickeners is further described for example in EP 789999, GB 2067407, EP 149459 and GB 2008949.

Other known thickeners are hydrophobically-modified silicas and synthetic polymers that are described, for example, in WO 2008135854 and U.S. Pat. No. 5,599,768. However, these thickeners are difficult to dissolve and homogenize them while avoiding the formation of gels or lumps and continued and careful monitoring of the process is required.

WO 2012/167322 relates to an agricultural oil-based suspension formulation comprising an active ingredient suspended in finely divided form in an oil; and at least one surfactant selected from a polyalkylene glycol-fatty acid condensate or a polyalkylene glycolether fatty acid condensate.

WO 2012/167321 relates to an agricultural oil-based suspension formulation comprising an active ingredient suspended in finely divided form in an oil; and at least one unsaturated rubber-type copolymer or a mixture thereof, wherein the rubber-type copolymer comprises at least styrene as a residue.

WO 2012/080208 relates to a method for the preparation of an agrochemical oil dispersion comprising a thickener which is an amide obtained by reacting a polyhydroxystearic acid with diethylene triamine and/or triethylene tetramine.

WO 2014/169363 relates to new agrochemical formulations of the oil dispersion type that comprise at least one active ingredient suspended in an oil phase, dispersants, a clay-based, rheological additive, a cellulose-derived, rheological additive and emulsifies, and optionally at least one additional active ingredient solubilized in the oil phase.

CN 104247712 relates to a dispersible oil suspension consisting of pyraclostrobin, mancozeb, an emulsifier, a dispersant, a wetting agent, a thickening agent, an antifreezing agent, a stabilizer, and a dispersion medium.

During the last decade the need for new agrochemical compositions with high performance has been increasing, while the number of chemicals approved for use in agrochemical compositions by regulatory authorities has been decreasing due to more rigid standards for the toxicological and ecological properties of these materials. As such, there is a need in the art for a fungicidal composition which allows reduced application rates of individual active ingredients while concurrently maintaining an increased efficacy of the active ingredients. Further, the combination of a multi-site fungicide (such as a dithiocarbamate fungicide) with two systemic fungicides (such as a triazole fungicide and a strobilurin fungicide) in a stable formulation provides a solution which reduces resistance of the diseases, reduces application rates of the active ingredients, improves yield and reduces costs.

Based on the aspects discussed above, there is a need in the art for a physically stable oil liquid formulation which will include a combination of a multi-site fungicide (such as a dithiocarbamate fungicide) with two systemic fungicides.

SUMMARY

According to one aspect, the present subject matter provides a fungicidal oil liquid formulation comprising: a) at least one dithiocarbamate fungicide; b) at least one co-fungicide selected from the group consisting of triazole fungicides and strobilurin fungicides; and c) an agrochemically acceptable non-aqueous liquid carrier; wherein the dithiocarbamate fungicide is suspended in the liquid carrier; wherein the co-fungicide is dissolved in the liquid carrier; and wherein the liquid carrier optionally comprises an adjuvant.

According to another aspect, the present subject matter provides a fungicidal oil liquid formulation comprising: a) at least one dithiocarbamate fungicide; and b) at least one triazole fungicide; c) at least one strobilurin fungicide; and d) an agrochemically acceptable non-aqueous liquid carrier; wherein the dithiocarbamate fungicide is suspended in the liquid carrier; wherein the triazole fungicide and the strobilurin fungicide are dissolved in the liquid carrier, and wherein the liquid carrier optionally comprises an adjuvant.

According to a further aspect, the present subject matter provides a fungicidal oil liquid formulation comprising: a) 20-60% by weight of at least one dithiocarbamate fungicide; b) 1-15% by weight of a combination of a triazole fungicide and a strobilurin fungicide; c) 10-50% by weight of a non-aqueous liquid carrier; and d) 1-40% by weight of at least one surfactant; wherein the dithiocarbamate fungicide is suspended in the liquid carrier; wherein the triazole fungicide and the strobilurin fungicide are dissolved in the liquid carrier; and wherein the liquid carrier optionally comprises an adjuvant.

According to a further aspect, the present subject matter provides a fungicidal suspoemulsion formulation comprising: a) the above mentioned fungicidal oil liquid formulation; and b) water.

According to yet a further aspect, the present subject matter provides a use of the fungicidal oil liquid formulation, for controlling or preventing a pest on plants or propagation material thereof.

DETAILED DESCRIPTION

Definitions

All technical and scientific terms used herein have the same meanings as commonly understood by someone ordinarily skilled in the art to which the present subject matter belongs. The following definitions are provided for clarity.

As used herein, the term "pesticide" broadly refers to an agent that can be used to control and/or kill a pest. The term is understood to include but is not limited to fungicides, insecticides, nematicides, herbicides, acaricides, parasiticides or other control agents. For chemical classes and applications, as well as specific compounds of each class, see "The Pesticide Manual Thirteenth Edition" (British Crop Protection Council, Hampshire, UK, 2003), as well as "The e-Pesticide Manual, Version 3" (British Crop Protection Council, Hampshire, UK, 2003-04), the contents of each of which are incorporated herein by reference in their entirety.

As used herein the term "plant" or "crop" includes reference to whole plants, plant organs (e.g. leaves, stems, twigs, roots, trunks, limbs, shoots, fruits etc.), plant cells, or plant seeds. This term also encompasses plant crops such as fruits. In yet another embodiment, the term "plant" may include the propagation material thereof, which may include all the generate parts of the plant such as seeds and vegetative plant material such as cuttings and tubers, which can be used for the multiplication of the plant. This includes seeds, tubers, spores, corms, bulbs, rhizomes, sprouts basal shoots, stolons, and buds and other parts of plants, including seedlings and young plants, which are to be transplanted after germination or after emergence from soil.

As used herein, the term "locus" includes not only areas where weeds may already be growing, but also areas where weeds have yet to emerge, and also to areas under cultivation.

As used herein, the term "mixture" or "combination" refers, but is not limited to, a combination in any physical form, e.g., blend, solution, alloy, or the like.

As used herein, the term "effective amount" refers to an amount of the compound that, when ingested, contacted with or sensed, is sufficient to achieve a good level of control.

As used herein, the phrase "enhancing crop plants" means improving one or more of plant quality, vigor, nutrient uptake, root strength, and/or tolerance to stress factors, any of which may lead to improved yield.

As used herein, the phrase "enhancing roots system" means the roots system is improved qualitatively or quantitatively. Enhanced roots system include but are not limited to improved visual appearance and composition of the roots system (i.e., improved color, density, uniformity, and visual appearance), increased root growth, a more developed root system, stronger and healthier roots, improved plant stand, and increased roots system weight.

As used herein, the phrase "improving nutrient uptake" or "increasing nutrient uptake" means the uptake of one or more nutrients is improved qualitatively or quantitatively. Such nutrients include but are not limited to nitrogen, phosphorus, potassium, calcium, copper, zinc, sulfur, and magnesium.

As used herein, the phrase "improving plant quality" means that one or more traits are improved qualitatively or quantitatively. Such traits include but are not limited to improved visual appearance and composition of the plant (i.e., improved color, density, uniformity, compactness), reduced ethylene (reduced production and/or inhibition of reception), improved visual appearance and composition of harvested material (i.e., seeds, fruits, leaves, vegetables), improved carbohydrate content (i.e., increased quantities of sugar and/or starch, improved sugar acid ratio, reduction of reducing sugars, increased rate of development of sugar), improved protein content, improved oil content and composition, improved nutritional value, reduction in anti-nutritional compounds, increased nutrient uptake, stronger and healthier roots, improved organoleptic properties (i.e, improved taste), improved consumer health benefits (i.e., increased levels of vitamins and antioxidants), improved post-harvest characteristics (i.e., enhanced shelf-life and/or storage stability, easier processability, easier extraction of compounds), and/or improved seed quality (i.e., for use in following seasons).

As used herein, the phrase "improving plant vigor" means that one or more traits are improved qualitatively or quantitatively. Such traits include but are not limited to early and/or improved germination, improved emergence, the ability to use less seeds, increased root growth, a more developed root system, stronger and healthier roots, increased shoot growth, increased tillering, stronger tillers, more productive tillers, increased or improved plant stand, decreased plant lodging, an improvement in plant height, an increase in plant weight (fresh or dry), bigger leaf blades, greener leaf color, increased pigment content, increased photosynthetic activity, earlier flowering, homogenous flowering, longer panicles, early grain maturity, increased seed, fruit, or pod size, increased pod or ear number, increased seed number per pod or ear, increased seed mass, enhanced seed filling, less dead basal leaves, delay of senescence, improved vitality of the plant and/or less inputs needed (i.e., less fertilizer, water, and/or labor).

As used herein, the phrase "improving tolerance to stress factors" means that one or more traits are improved qualitatively or quantitatively. Such traits include but are not limited to increased tolerance and/or resistance to abiotic stress factors, which cause suboptimal growing conditions such as drought (i.e., any stress which leads to a lack of water content in plants, a lack of water uptake potential or a reduction in the water supply to plants), cold exposure, heat exposure, osmotic stress, UV stress, flooding, increased salinity (i.e., in the soil), increased mineral exposure, ozone exposure, high light exposure and/or limited availability of nutrients (i.e., nitrogen and/or phosphorous nutrients).

As used herein, the phrase "improving plant yield" or "improving yield" means that where it is possible to take a quantitative measurement, the yield of a product of the respective plant is increased. Such an improvement in yield includes but is not limited to (a) an increase in biomass production, grain yield (i.e., grain size, grain number, grain density), starch content, oil content, and/or protein content, which may result from (i) an increase in the amount produced by the plant per se, or (ii) an improved ability to harvest plant matter; (b) an improvement in the composition of the harvested material (i.e., improved sugar acid ratios, improved oil composition, increased nutritional value, reduction of anti-nutritional compounds, increased consumer health benefits); and/or (c) an increased/facilitated ability to harvest the crop, improved processability of the crop, and/or better storage stability/shelf life.

As used herein, the phrase "agriculturally acceptable carrier" means carriers which are known and accepted in the art for the formation of formulations for agricultural or horticultural use.

As used herein, the term "adjuvant" is broadly defined as any substance that itself is not a fungicide but which enhances or is intended to enhance the effectiveness of the fungicide with which it is used. Adjuvants may be understood to include sticking agents, spreading agents, surfactants, synergists, penetrants, compatibility agents, buffers, acidifies, defoaming agents, thickeners and drift retardants.

The term "a" or "an" as used herein includes the singular and the plural, unless specifically stated otherwise. Therefore, the terms "a," "an" or "at least one" can be used interchangeably in this application.

Throughout the application, descriptions of various embodiments use the term "comprising"; however, it will be understood by one of skill in the art, that in some specific instances, an embodiment can alternatively be described using the language "consisting essentially of" or "consisting of."

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques. In this regard, used of the term "about" herein specifically includes ±10% from the indicated values in the range. In addition, the endpoints of all ranges directed to the same component or property herein are inclusive of the endpoints, are independently combinable, and include all intermediate points and ranges.

Fungicidal Oil Liquid Formulations

The oil liquid formulations of the present subject matter were found to be stable and showed no phase separation, precipitation or particle agglomeration when stored for a long period of time. Moreover, a major advantage of this formulation is the ability to suspend a high concentration of at least one dithiocarbamate fungicide in the non-aqueous liquid carrier and dissolve at least one triazole fungicide and at least one strobilurin fungicide in the non-aqueous liquid carrier without loss of stability of the formulation. This allows active ingredients with different physicochemical properties commonly formulated into formulations such as SC and WG, to be combined into a single formulation.

Such combination of different active ingredients in a single formulation is important;
(i) agrochemically, since a combination of active ingredients is often required for the correct chemical management of pests, providing the required efficacy and preventing the emergence of resistant species, and
(ii) with respect to active ingredient compatibility, because there is often compatibility issues between different types of formulations of active ingredients when the active ingredients are tank-mixed in order to combine active ingredients for the application in the field. Such a mixture is commonly made in the spray tank, which leads to incompatibility issues between different types of formulations.

In addition, there is an economic advantage in that the oil liquid formulation may include an adjuvant therein, as opposed to adding the adjuvant in the spray tank. This further brings logistic, packaging, and storage benefits to the farmer, as a single product can be used instead of two or more.

The present subject matter relates to a fungicidal oil liquid formulation comprising: (a) at least one dithiocarbamate fungicide; (b) at least one triazole fungicide; (c) at least one strobilurin fungicide, and (d) an agrochemically acceptable non-aqueous liquid carrier; wherein the dithiocarbamate fungicide is suspended in the liquid carrier; and wherein the triazole fungicide and the strobilurin fungicide are dissolved in the liquid carrier, and wherein the liquid carrier optionally comprises an adjuvant.

According to another embodiment, the subject matter relates to a fungicidal oil liquid formulation comprising: (a) at least one dithiocarbamate fungicide; (b) at least one co-fungicide selected from the group consisting of triazole fungicides and strobilurin fungicides, and (c) an agrochemically acceptable non-aqueous liquid carrier; wherein the dithiocarbamate fungicide is suspended in the liquid carrier; and wherein the co-fungicide is dissolved in the liquid carrier, and wherein the liquid carrier optionally comprises an adjuvant.

The dithiocarbamate fungicide may include but is not limited to ferbam, mancozeb, maneb, metiram, propineb, thiram, zinc thiazole, zineb and ziram.

The triazole fungicide may include but is not limited to azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, metconazole, myclobutanil, penconazole, propiconazole, simeconazole, tebuconazole, tetraconazole, triadimefon, triadimenol, triticonazole and prothioconazole.

The strobilurin fungicide may include but is not limited to azoxystrobin, coumoxystrobin, enoxastrobin, flufenoxystrobin, picoxystrobin, pyraoxystrobin, mandestrobin, pyraclostrobin, pyrametostrobin, triclopyricarb, kresoximmethyl, trifloxystrobin, dimoxystrobin, fenaminstrobin, metominostrobin, orysastrobin and fluoxastrobin.

For chemical classes of fungicides, as well as specific compounds of each class, see "The Pesticide Manual Thirteenth Edition" (British Crop Protection Council, Hampshire, UK, 2003), as well as "The e-Pesticide Manual, Version 5.2" (British Crop Protection Council, Hampshire, UK, 2008-2011), the contents of each of which are incorporated herein by reference in their entirety.

In a preferred embodiment, the subject matter relates to a fungicidal oil liquid formulation comprising: a) mancozeb, suspended in a non-aqueous liquid carrier; and b) tebuconazole and picoxystrobin, dissolved in the non-aqueous liquid carrier.

In another preferred embodiment, the subject matter relates to a fungicidal oil liquid formulation comprising: a) mancozeb, suspended in a non-aqueous liquid carrier; and b) prothioconazole and picoxystrobin, dissolved in the non-aqueous liquid carrier.

In another preferred embodiment, the subject matter relates to a fungicidal oil liquid formulation comprising: a) mancozeb, suspended in a non-aqueous liquid carrier; and b) prothioconazole and trifloxystrobin, dissolved in the non-aqueous liquid carrier.

In another preferred embodiment, the subject matter relates to a fungicidal oil liquid formulation comprising: a) mancozeb, suspended in a non-aqueous liquid carrier; and b) prothioconazole, dissolved in the non-aqueous liquid carrier.

In an embodiment, the amount of the dithiocarbamate fungicide may be about (0.1-80 wt. %, or about 0.1-70 wt. %, based on the total weight of the composition. In a further embodiment, the dithiocarbamate fungicide may be present in a concentration of about 20-60% by weight based upon the total weight of the composition. In yet a further embodiment, the dithiocarbamate fungicide may be present in a concentration of about 25-50% by weight based upon the total weight of the composition. In another embodiment, the dithiocarbamate fungicide may be present in a concentration of about 30-40% by weight based upon the total weight of the composition. In another embodiment, the dithiocarbamate fungicide may be present in a concentration of about 35-45% by weight based upon the total weight of the composition. In a specific embodiment, the dithiocarbamate fungicide may be present in a concentration of about 38% by weight based upon the total weight of the composition.

In an embodiment, the amount of the triazole fungicide and the strobilurin fungicide together may be present in a concentration of about 0.1-30 wt. %, based on the total weight of the composition. In a further embodiment, the amount of the triazole fungicide and the strobilurin fungicide together may be present in a concentration of about 1-15% by weight based upon the total weight of the composition. In another embodiment, the amount of the triazole fungicide and the strobilurin fungicide together may be present in a concentration of about 1-10% by weight based upon the total weight of the composition. In yet another embodiment, the amount of the triazole fungicide and the strobilurin fungicide together may be present in a concentration of about 3-8% by weight based upon the total weight of the composition. In a specific embodiment, the amount of the triazole fungicide and the strobilurin fungicide together may be present in a concentration of about 5% by weight based upon the total weight of the composition.

In an embodiment, the amount of the co-fungicide may be present in a concentration of about 0.1-30 wt. %, based on the total weight of the composition. In a further embodiment, the amount of the co-fungicide may be present in a concentration of about 1-15% weight based upon the total weight of the composition. In another embodiment, the amount of the co-fungicide may be present in a concentration of about 1-10% by weight based upon the total weight of the composition. In yet another embodiment, the amount of the co-fungicide may be present in a concentration of about 1-5% by weight based upon the total weight of the composition. In a specific embodiment, the amount of the co-fungicide may be present in a concentration of about 3% by weight based upon the total weight of the composition.

According to embodiments, the non-aqueous liquid carrier may include but is not limited to aromatic hydrocarbons (e.g. toluene, o-, m-, p-xylene, ethylbenzene, isopropylbenzene, tert-butylbenzene, naphthalenes, mono- or polyalkyl-substituted naphthalenes), paraffins (e.g. octane, nonane, decane, undecane, dodecane, tridecane, tetradecane, pentadecane, hexadecane, hepta-decane, octa-decane, nona-decane, eicosance, heneicosane, docosane, tricosane, tetracosane, pentacosane, and branched chain isomers thereof), petroleum, ketones (e.g. acetophenone, cyctohexanone), vegetable oil (e.g. olive oil, kapok oil, castor oil papaya oil, camellia oil, palm oil, sesame oil, corn oil, rice bran oil, peanut oil, cotton seed oil, soybean oil, rapeseed oil, linseed oil, tung oil, sunflower oil, safflower oil, tall oil), alkyl ester of vegetable oils, (e.g. rapeseed oil methyl ester or rapeseed oil ethyl ester, rapeseed oil propyl esters, rapeseed oil butyl esters, tall oil fatty acids esters etc . . . ), diesel, mineral oil, fatty acid amides (e.g. $C_1$-$C_3$ amines, alkylamines or alkanolamines with $C_6$-$C_{18}$ carboxylic acids), fatty acids, tall oil fatty acids, alkyl esters of fatty acids (e.g. $C_1$-$C_4$ monohydric alcohol esters of $C_8$ to $C_{22}$ fatty acids such as methyl oleate, ethyl oleate), modified vegetable oils and combinations thereof.

In a preferred embodiment, the non-aqueous liquid carrier may include but is not limited to aromatic hydrocarbons, fatty acid amides, alkyl ester of vegetable oils and vegetable oils.

In an embodiment, the amount of the non-aqueous liquid carrier may be about 0.1-60 wt %, about 0.1-55 wt. %, or about 0.1-50 wt. %, based on the total weight of the composition. In another embodiment, the non-aqueous liquid carrier may be present in a concentration of about 10-50% by weight based upon the total weight of the composition. In a further embodiment, the non-aqueous liquid carrier may be present in a concentration of about 15-50% by weight based upon the total weight of the composition. In another embodiment, the non-aqueous liquid carrier may be present in a concentration of about 20-40% by weight based upon the total weight of the composition. In yet another embodiment, the non-aqueous liquid carrier may be present in a concentration of about 25-40% by weight based upon the total weight of the composition. In a further embodiment, the non-aqueous liquid carrier may be present in a concentration of about 30-35% by weight based upon the total weight of the composition. In a specific embodiment, the non-aqueous liquid carrier may be present in a concentration of about 34% by weight based upon the total weight of the composition.

According to embodiments, the adjuvant in the liquid carrier may include but is not limited to vegetable oils, alkyl esters of vegetable oils such as for example, soy methyl ester, soy ethyl ester, rapeseed oil methyl ester or rapeseed oil ethyl ester, alkoxylated sorbitan esters such as for example sorbitan monolaurate alkoxylates such as for example polyoxyethylene (16) sorbitan monolaurate (Tween™ 24), polyoxyethylene (20) sorbitan monolaurate (Tween™ 20; Alkamuls® PSML-20), polyoxyethylene (4) sorbitan monolaurate (Tween™ 21), polyoxyethylene (8) sorbitan monolaurate (Tween™ 22, polyoxyethylene (12) sorbitan monolaurate (Tween™ 23), sorbitan monolaurate (Alkamuls® S/20, Glycomul® LK, Glycomul® LC, Span® 20), polyoxyethylene (20) sorbitan monostearate alkoxylates such as for example polyoxyethylene (20) sorbitan monosterate (Tween™ 60), polyoxyethylen (4) sorbitan monostearate (Tween™ 61), sorbitan monostearate (Alkamuls® S/90, Glycomul® s, Span® 60), sorbitan monooleate alkoxylates such as for example polyoxyethylene (20) sorbitan monooleate (Tween™ 80), Emulgin® SMO 20, T-Maz® 80, Agnique® SMO 20U), polyoxyethylene (5) sorbitan monooleate (Tween™ 81), sorbitan monooleate (Alkamuls® S/80, Span® 80), and combinations thereof.

In a preferred embodiment, the adjuvant in the liquid carrier comprises tall oil fatty acids (TOFA) and/or soy methyl ester and/or sorbitan monolaurate alkoxylates such as polyoxyethylene (16) sorbitan monolaurate (Tween™ 24).

In an embodiment, the adjuvant is present in the amount of at least 10% of the total weight of all components in the formulation. In another embodiment, the adjuvant is present in the amount of at least 15% of the total weight of all components in the formulation. In a further embodiment, the adjuvant is present in the amount of at least 20% of the total weight of all components in the formulation. In yet another embodiment, the adjuvant is present in the amount of at least 30% of the total weight of all components in the formulation. In a specific embodiment, the total amount of adjuvant may be present in a concentration of about 17% by weight based upon the total weight of the composition. In another specific embodiment, the total amount of adjuvant may be present in a concentration of about 35% by weight based upon the total weight of the composition.

According to embodiments, the fungicidal oil liquid formulation further comprises at least one surfactant. The at least one surfactant may include but is not limited to alkyl sulfonates, alkyl benzene sulfonates, alkyl aryl sulfonates, alkylphenolalkoxylates, tristyryiphenol ethoxylates, natural or synthetic fatty ethoxylate alcohols, natural or synthetic fatty acid alkoxylates, natural or synthetic fatty alcohols alkoxylates, alkoxylated alcohols (such as n-butyl alcohol poly glycol ether), block copolymers (such as ethylene oxide-propylene oxide block copolymers and ethylene oxide-butylene oxide block copolymers) or combinations thereof.

In a preferred embodiment, the surfactant may include but is not limited to tristyrylphenol ethoxylates, alkyl benzene sulfonates and n-butyl alcohol poly glycol ether.

In an embodiment, the total amount of surfactants present in the formulation may be about 0.1-40 wt %, about 0.1-35 wt. %, or about 0.1-30 wt %, based on the total weight of the composition. In a further embodiment, the total amount of surfactants may be present in a concentration of about 1-40% by weight based upon the total weight of the composition. In another embodiment, the total amount of surfactants may be present in a concentration of about 10-40% by weight based upon the total weight of the composition. In yet another embodiment, the total amount of surfactants may be present in a concentration of about 15-25% by weight based upon the total weight of the composition. In a specific embodiment, the total amount of surfactants may be present in a concentration of about 24% by weight based upon the total weight of the composition. In another specific embodiment, the total amount of surfactants may be present in a concentration of about 9% by weight based upon the total weight of the composition.

In an embodiment, the total amount of surfactants selected from the group including but is not limited to tristyrylphenol ethoxylates, alkyl benzene sulfonates and n-butyl alcohol poly glycol ether may be present in a concentration of about 1-40% by weight based upon the total weight of the composition.

Other ingredients, such as adhesives, neutralizers, thickeners, binders, sequestrates, biocides, stabilizers, buffers preservatives, antioxidants or anti-freeze agents, may also be added, to the present compositions in order to increase the stability, density, and viscosity of the described compositions.

Further, the agricultural compositions herein may be used in conjunction with one or more other pesticides to control a wider variety of undesirable pests. When used in conjunction with other pesticides, the herein described composition maybe formulated with the other pesticide/s, tank mixed with the other pesticide/s or applied sequentially with the other pesticide/s. In addition, herein described composition may, optionally, be combined with or blended with other pesticide compositions. This blend of pesticide may be used to control pests in crops and non-crop environments.

In some embodiments, the agricultural compositions herein may be used in conjunction with one or more other adjuvants.

Methods of Use

The formulations described herein are suitable for the control of undesirable pests such as phytopathogenic fungi. Methods include adding the fungicidal oil liquid formulation to a carrier such as water and using the resulting solution containing the fungicidal formulation for spray applications to control phytopathogenic fungi in plant or propagation material thereof in crop or non-crop environments.

By diluting the fungicidal oil liquid formulation in water, a suspoemulsion may be formed.

Effective application rates of the pesticidal composition cannot generally be defined, as it varies depending upon various conditions such as the type of pesticide, target pest, weather conditions, nature of the soil, and the type of crop. In one embodiment, the fungicidal oil liquid formulation is generally applied at a rate of about 1 to about 5 L/ha. In a preferred embodiment the fungicidal oil liquid formulation is applied at a rate of about 2 to 3 L/ha. In a specific embodiment the fungicidal oil liquid formulation is applied at a rate of about 2 L/ha. In another specific embodiment the fungicidal oil liquid formulation is applied at a rate of about 3 L/ha. In another specific embodiment the fungicidal oil liquid formulation is applied at a rate of about 2.5 L/ha.

In an embodiment, the fungicidal oil liquid formulation may be diluted in a carrier such as water in an amount of from about 1 to 100 L of the fungicidal formulation per 1000 L of water. In a further embodiment, the composition may be diluted in a carrier such as water in an amount of from about 1 to 30 L of the fungicidal formulation per 1000 L of water. In yet another embodiment, the composition may be diluted in a carrier such as water in an amount of from about 5 to 15 L of the fungicidal formulation per 1000 L of water.

The methods of the present subject matter may be applied to any crop plants, including but not limited to soybean, cereals, wheat corn, papaya, melon, cacao and coffee.

In another embodiment, the phytopathogenic fungi are one or more of the classes including but not limited to soybean rust (*Phakopsora pachyrhizie*), target spot (*Corynespora cassiicola*), late season diseases (*Septoria glycines* and *Cercospora kikuchii*), Northern leaf blight (*Exserohilum turcicum*), yellow leaf spot (*Dreshslera tritici-repentis*), Phaeosphaeria leaf spot (*Phaeosphaeria maydis*), Anthracnose (*Colletotrichum gloeosporioides*), Cereal smuts, Common smut (*Ustilago maydis*), Head smut (*Sphacelotheca reiliana*), False smut (*Ustilaginoidea virens*), Flag smut (*Usrocystis agropyri*), Loose smut of wheat/barley (*Ustilago nuda*), Covered smut (*Ustilago segetum* var. *hordei*), and Semi-loose smut (*Ustilago avenae*).

the agricultural compositions herein may be mixed with water and/or fertilizers and may be applied to a desired locus by any means, such as airplane spray tanks, knapsack spray tanks, cattle dipping vats, farm equipment used in ground spraying (e.g., boom sprayers, hand sprayers), and the like. The desired locus may be soil, plants, and the like.

The agricultural compositions herein may be applied to soybeans from vegetative growth stage: V2 (Second trifoliolate—two sets of unfolded trifoliolate leaves) to reproductive growth stage R8 (Full maturity—95% of the pods have reached their full mature color).

The present composition may include additional crop protection agents, for example insecticides, herbicides, fungicides, bactericides, nematicides, molluscicides, growth regulators, biological agents, fertilizers, or mixtures thereof. When used in conjunction with additional crop protection agents, the composition can be formulated with these co-agents, tank mixed with the co-agents or applied sequentially with the co-agents.

Methods of Preparation

The present subject matter also extends to a process for obtaining fungicidal oil liquid formulation comprising the steps of:

(1) dissolving at least one triazole fungicide and at least one strobilurin fungicide in a non-aqueous liquid carrier;
(2) stirring the mixture in step (1);
(3) adding surfactants;
(4) adding at least one dithiocarbamate fungicide; and
(5) continue stirring until a complete homogeneous formulation is achieved.

In an embodiment, an adjuvant is optionally added in step (3). In another embodiment, a surfactant may also be added in step (2) and/or a non-aqueous liquid carrier may also be added in step (3).

Example 1

A formulation was made according to following procedure:

Solvesso 200: (Heavy aromatic naphthalene), N,N-Dimethyldecanamide, TSP 16EO-Tristyrylphenol ethoxylates, and dodecylbenzene sulfonic acid, calcium salt were added to a vessel. Under agitation, picoxystrobin and tebuconazole were charged. While stirring, the mixture was heated to 70 to 75° C. Stirring was maintained until the picoxystrobin and tebuconazole were completely dissolved. The heat was turned off. While stirring, n-butyl alcohol polyglycol ether, and methyl soyate were added to the vessel. Mancozeb and micronized hexamethylenetetramine were then added to the mixture. The rate of stirring was increased to 800 RPM. The stirring was continued until a complete homogeneous formulation was achieved.

Formula I

| Ingredients | g/L |
|---|---|
| Picoxystrobin | 27 |
| Tebuconazole | 34 |
| Mancozeb (85% A.I.) | 471(400) |
| Solvesso Heavy aromatic naphthalene | 150 |
| Armid DM10-AkzoNobel: N,N-Dimethyldecanamide | 50 |
| TSP 16EO 16EO-Tristyrylphenol ethoxylates | 130 |
| Ultraric 5000 n-butyl alcohol polyglycol ether | 65 |
| Dodecylbenzene sulfonic acid, calcium salt | 105 |
| Methyl soyate | 214 |
| Hexamethylenetetramine (HMTA) | 1 |

Example 2

A formulation was made according to following procedure:

Solvesso 200 (Heavy aromatic naphthalene), N,N-Dimethyldecanamide, TSP 16EO-Tristyrylphenol ethoxylates, and dodecylbenzene sulfonic acid, calcium salt were added to a vessel. Under agitation, picoxystrobin and tebuconazole were charged. While stirring, the mixture was heated to 70 to 75° C. Stirring was maintained until the picoxystrobin and tebuconazole were completely dissolved. The heat was turned off.

While stirring, n-butyl alcohol polyglycol ether, methyl soyate and TOFA were added to the vessel. Mancozeb and micronized hexamethylenetetramine were then added to the mixture. The rate of stirring was increased to 800 RPM. The stirring was continued until a complete homogeneous formulation was achieved.

Formula II

| Ingredients | g/L |
|---|---|
| Picoxystrobin | 27 |
| Tebuconazole | 34 |
| Mancozeb (85% A.I.) | 471 (400) |
| Solvesso Heavy aromatic naphthalene | 140 |
| Armid DM10-AkzoNobel: N,N-Dimethyldecanamide | 50 |
| TSP 16EO 16EO-Tristyrylphenol ethoxylates | 130 |
| Ultraric 5000 n-butyl alcohol polyglycol ether | 65 |
| Dodecylbenzene sulfonic acid, calcium salt | 105 |
| Methyl soyate | 114 |
| Tall Oil Fatty Acids | 100 |
| Hexamethylenetetramine (HMTA) | 1 |

Example 3

A formulation was made according to following procedure:

Solvesso 200 (Heavy aromatic naphthalene), Tween® 24, TSP 16EO-Tristyrylphenol ethoxylates, and dodecylbenzene sulfonic acid, calcium salt were added to a vessel. Under agitation, picoxystrobin and tebuconazole were charged. While stirring, the mixture was heated to 70 to 75° C. Stirring was maintained until the picoxystrobin and tebuconazole were completely dissolved. The heat was turned off. While stirring, ethopropoxylated alcohol, methyl soyate and TOFA were added to the vessel. Mancozeb, hexamethylenetetramine and an antifoam agent were then added to the mixture. The rate of stirring was increased to 800 RPM. The stirring was continued until a complete homogeneous formulation was achieved.

Formula III

| Ingredients | g/L |
|---|---|
| Picoxystrobin | 27 |
| Tebuconazole | 34 |
| Mancozeb (85% A.I.) | 470 (400) |
| Solvesso Heavy aromatic naphthalene | 145 |
| Tween ™ 24 | 141 |
| TSP 16EO 16EO-Tristyrylphenol ethoxylates | 20 |
| Antarox B-848 ethopropoxylated alcohol | 4 |
| Dodecylbenzene sulfonic acid, calcium salt | 85 |
| Methyl soyate | 230 |
| Tall Oil Fatty Acids | 50 |
| Hexamethylenetetramine | 0.5 |
| Antifoam (AE100). | 0.5 |

The formulation of Formula III appears as an opaque homogeneous yellow liquid.

Determination of Dynamic Viscosity

The dynamic viscosity of the formulation of Formula III was measured using a rotational viscometer LVT and spindle no63. The viscometer was adjusted to the right rotation (60 rpm) and reading was carried out after 30 seconds of rotation of the red pointer for viscometer stabilization. Two determinations of dynamic viscosity of the formulation were performed 1) at 20±0.2° C. and 2) at 40±0.2° C. Dynamic viscosity of the formulation at 20±0.2° C. was determined to be 1160 mPa·s and at 40±0.2° C. as 560 mPa·s.

Determination of Miscibility at 30° C.

The formulation of Formula III was added to three different solvents 1) standard water with a hardness of 20 ppm $CaCO_3$; 2) acetone; and 3) ethanol. Each solution was prepared by transferring approximately 2 mL of the formulation into a 250 mL beaker and then diluted with 50 mL of solvent (water, acetone and ethanol). Each solution was mixed for 3 minutes and then transferred to a 100 mL graduated cylinder and its volume completed to 90 mL with the applicable solvent. The solutions were immersed in a bath at a controlled temperature of 30±1° C. After reaching thermal equilibrium, the cylinders were filled to a final volume of 100 mL with the applicable solvent. The cylinders were inverted 30 times, once every 2 seconds, returning to its original position. The solutions were immersed in a bath at a controlled temperature of 30±1° C. and after 1 hour at rest, the solutions were tested for homogeneity, with or without, separation of solid or liquid phases.

Under the above conditions, precipitation of less than 1% was noted for the standard water solutions; approximately 4% of precipitation was noted for the acetone solution; and approximately 6% of precipitation was noted for the ethanol solution. No liquid phase separation was noted for any of the solutions.

Stability Test

Approximately 50 ml of the OD formulation of Formula III were added to three glass vials. The vials were sealed with rubber stopper and an aluminum seal, one of these was kept at room temperature and the other two were kept in an oven at a temperature of 20±2° C. After 14 days of incubation the concentration of active ingredients were determined by liquid chromatography (HPLC) and gas chromatography (GC/FID), The study of thermal stability and the air follows the GLP procedure 50010/Rev. 04—Determination of Thermal Stability and Air. The percentage degradation was calculated by comparing the concentration of the active ingredients at both room temperature and at the elevated temperature.

According to the above test, there was only about a 2% degradation, of mancozeb, about a 0.2% degradation of picoxystrobin and about a 2.4% degradation of tebuconazole. As such the OD formulation of Formula III can be considered stable at room temperature as well as at higher temperatures (55° C.).

Once formulated, the OD formulation of Formula III produced by the method of the present subject matter would be expected to show stability on storage at temperatures ranging from −5° C. to 55° C. for up to 2 weeks and also stability at ambient temperature for up to 2 years.

The oil dispersion formulation of the subject matter has good stability over an extended period of time and also at elevated temperatures. These dispersions are easily pourable and dispersible into water.

Field Trial 1:

The formulation of Formula I was applied to a crop of soybean to determine its efficacy against soybean rust (*Phakopsora pachyrhizie*). The formulation was applied at a rate of 3 L/ha.

For comparison, the same disease was also treated with (i) a WG formulation of picoxystrobin+tebuconazole+mancozeb (40+40+600 g/Kg) at a rate of 2 Kg/ha.

TABLE 1

| Formulation | % Severity (Pre-spray) | % Severity (15 DA1) | % Severity (14 DA2) | % Defoliation (14 DA2) | % Severity (14 DA3) | % Defoliation (14 DA3) |
|---|---|---|---|---|---|---|
| WG Formulation | 1.9 | 41.7 | 75.1 | 21.3 | 80.4 | 26.3 |
| Formula I | 2.3 | 39.2 | 74.4 | 21.3 | 79.4 | 27.5 |

DA1 = Days after $1^{st}$ spray
DAY 2 = Days after $2^{nd}$ spray
DAY 3 = Days after $3^{rd}$ spray Field Trial 2:

The formulation of Formula III was applied to a crop of wheat to determine its efficacy against yellow leaf spot (*Drechslera tritici-repentis*). At the time of application the pressure of the disease on the crop was considered to be high (high disease incidence). The formulation was applied at a rate of 3 L/ha.

For comparison, the same disease was also treated with (i) a WG formulation of picoxystrobin+tebuconazole+mancozeb (40+40+600 g/Kg) at a rate of 2 Kg/ha together with Nimbus® at a rate of 500 ml/ha; and (ii) the formulation of Formula III at a rate of 3 L/ha together with Nimbus® at a rate of 500 ml/ha.

TABLE 2

| Formulation | % Efficacy |
|---|---|
| Formula III | 69% |
| Formula III + Nimbus ® | 78% |
| WG Formulation + Nimbus ® | 57% |

Field Trials 3-5

In a series of three different field trial, the formulation of Formula III was applied to a crop of soybean to determine its efficacy against soybean rust (*Phakopsora pachyrhizie*). The formulation was applied at a rate of 2.5 L/ha (67.5 g of picoxy+82.5 g of tebuco+1000 g of MZB).

For comparison, the same disease was also treated with (i) a WG formulation of picoxystrobin+tebuconazole+mancozeb (40+40+600 g/Kg) at a rate of 2 Kg/ha.

TABLE 3

| Formulation | Trial 3- L. E. Magalhães, Brazil % Efficacy | Trial 3- Passo Fundo, Brazil % Efficacy | Ponta Grossa, Brazil |
|---|---|---|---|
| Formula III | 94 | 93 | 85 |
| WG Formulation | 84 | 88 | 73 |

For field trials 1-5, the efficacy of the OD formulation was calculated using Abbott's formula as defined by Abbott in an article entitled "A method of computing the effectiveness of an insecticide" published in the Journal of Economic Entomology, 1925, vol. 18, p. 265-267, incorporated herein by reference in its entirety. The efficacy of a fungicidal treatment may be calculated as follows:

$$\text{Efficacy } \% = \frac{X - Y}{X} \times 100;$$

in which X represents disease severity of the control (non-treated crop) and Y represents disease severity of the treated crop.

$EC_{50}$ Comparison:

The $EC_{50}$ of the OD formulation of Formula III was compared with the $EC_{50}$ of the WG formulation. Soybean leaves infected with *Phakopsora pachyrhizie* were treated with one of the OD or WG formulations. The $EC_{50}$ for the OD formulation was 4.3 ppm and the $EC_{50}$ for the WG formulation was 15.5 ppm. $EC_{50}$ is defined as the dose that provides 50% inhibition of a fungal isolate as compared to a non-fungicide-amended control. The lower the $EC_{50}$ value the more effective the fungicide or fungicidal formulation.

Conclusions:

As can be seen above, the formulation of the present subject matter performs the same if not better than the equivalent WG formulation comprising the same active ingredients. By showing higher levels of efficacy, at lower concentrations of active ingredients the OD formulation shows to be superior over the WG formulation.

Example 4

A formulation was made according to following procedure:

Solvesso 200 (Heavy aromatic naphthalene), Tween® 24, TSP 16EO-Tristyrylphenol ethoxylates, dodecylbenzene sulfonic acid, calcium salt, acetophenone and TOFA were added to a vessel. Under agitation (300-400 rpm), prothioconazole was charged. While stirring, the mixture was heated to 70 to 75° C. Stirring was maintained until the prothioconazole was completely dissolved. The heat was turned off. While stirring, methyl soyate and silicone oil were added to the vessel. Mancozeb was then added to the mixture. The rate of stirring was increased to 800 RPM. The stirring was continued until a complete homogeneous formulation was achieved.

Formula IV

| Ingredients | g/L |
|---|---|
| Mancozeb | 500 |
| Prothioconazole | 40 |
| Solvesso Heavy aromatic naphthalene | 40 |
| Tween ™ 24 | 160 |
| Atlas G5002 LQ (alcohol polyglycol ether) | 5 |
| Calcium Dodecylbenzene sulfonate | 90 |
| Tall Oil Fatty Acids | 50 |
| Acetophenone | 140 |
| Silicone Oil | 0.2 |
| Methyl soyate | Up to 1000 L (~170 g) |

The $EC_{50}$ of the OD formulation of Formula IV was compared with the $EC_{50}$ of a tank mixture comprising prothioconazole and mancozeb. Soybean leaves infected with *Phakopsora pachyrhizie* were treated with either the mixture or the OD formulation. The $EC_{50}$ for the OD formulation was 17.2 ppm and the $EC_{50}$ for the tank mixture was 19.4 ppm.

As described above, in the fungicidal oil liquid formulation has significant advantages over the mixtures and formulations which are known in the art. The formulation is physically stable and easy to use in the fields.

In order to show that the fungicidal oil liquid formulation performs at least as well as mixtures and formulations known in the art, the formulation may be applied to a crop such as soybean. Its control against diseases such as soybean rust may be determined by methods known in the art. The formulation may be applied at multiple application rates and/or multiple applications may be applied.

While the present subject matter has been shown and described with reference to preferred embodiments thereof, it will be understood by those skilled in the art that many alternatives, modifications and variations may be made thereto without departing from the spirit and scope thereof. Accordingly, it is intended to embrace all such alternatives, modifications, and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference.

What is claimed is:

1. A fungicidal oil liquid formulation comprising:
   (a) mancozeb, present in the amount of 20-60% by weight of the total weight of all components in the formulation;
   (b) a triazole fungicide or a triazole fungicide and a strobilurin fungicide, present in the amount of 1-15% by weight of the total weight of all components in the formulation;
   (c) an agrochemically acceptable non-aqueous liquid carrier, present in the amount of 10-50% of the total weight of all components in the formulation, and selected from aromatic hydrocarbons, paraffins, petroleum, vegetable oil, alkyl ester of vegetable oils, diesel, mineral oil, fatty acid amides, fatty acids, alkyl esters of fatty acids, modified vegetable oils, ketones, or a combination thereof; and
   (d) a surfactant present in the amount of 1-40% by weight of the total weight of all components in the formulation, and selected from alkyl sulfonates, alkyl benzene sulfonates, alkyl aryl sulfonates, alkylphenolalkoxylates, tristyrylphenol ethoxylates, natural or synthetic fatty ethoxylate alcohols, natural or synthetic fatty acid alkoxylates, block copolymers, natural or synthetic fatty alcohols alkoxylates, alkoxylated alcohols, or combinations thereof;
   wherein the mancozeb is suspended in the non-aqueous liquid carrier; wherein the triazole fungicide or the triazole fungicide and strobilurin fungicide are dissolved in the non-aqueous liquid carrier; and
   wherein the non-aqueous liquid carrier optionally comprises an adjuvant, the adjuvant in the liquid carrier, if present, i) is selected from vegetable oils, alkyl ester of vegetable oils, alkoxylated sorbitan esters, or a combination thereof wherein the alkoxylated sorbitan ester is optionally selected from the group consisting of sorbitan monolaurate alkoxylates, sorbitan monostearate alkoxylates, sorbitan monooleate alkoxylates, or a combination thereof, or (ii) is at least one of methyl ester of soybean oil, tall oil fatty acids, and polyoxyethylene (16) sorbitan monolaurate.

2. The fungicidal oil liquid formulation of claim 1, wherein:
   the triazole fungicide is selected from the group consisting of azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, metconazole, myclobutanil, penconazole, propiconazole, simeconazole, tebuconazole, tetraconazole, triadimefon, triadimenol, triticonazole and prothioconazole, and/or the strobilurin fungicide is selected from the group consisting of azoxystrobin, coumoxystrobin, enoxastrobin, flufenoxystrobin, picoxystrobin, pyraoxystrobin, mandestrobin, pyraclostrobin, pyrametostrobin, triclopyricarb, kresoximmethyl, trifloxystrobin, dimoxystrobin, fenaminstrobin, metominostrobin, orysastrobin and fluoxastrobin.

3. A fungicidal suspoemulsion comprising: a) the fungicidal oil liquid formulation according to claim 1 and b) water.

4. The fungicidal oil liquid formulation of claim 1, wherein said fungicidal oil liquid formulation comprises:
   (a) 35-45% by weight of mancozeb, and
   (b) 1-5% by weight of the triazole fungicide and 1-5% by weight of the strobilurin fungicide.

5. The fungicidal oil liquid formulation of claim 1, wherein said fungicidal oil liquid formulation comprises:
   (a) about 38% by weight of mancozeb, and
   (c) about 3% by weight of the triazole fungicide and about 3% by weight of the strobilurin fungicide.

6. The fungicidal oil liquid formulation of claim 1, wherein said fungicidal oil liquid formulation comprises:
   (a) about 38% by weight of mancozeb, and
   (b) 1-5% by weight of the triazole fungicide and 1-5% by weight of the strobilurin fungicide.

7. The fungicidal oil liquid formulation of claim 1, wherein the non-aqueous liquid carrier comprises three adjuvants and the adjuvants are methyl ester of soybean oil, tall oil fatty acids, and polyoxyethylene (16) sorbitan monolaurate.

8. The fungicidal oil liquid formulation of claim 1 comprising:
   (a) 30-40% by weight or 35-45% by weight of mancozeb based on the total weight of all components in the formulation;
   (b) 1-15% by weight of the triazole fungicide, or the triazole fungicide and the strobilurin fungicide;
   (c) 10-50% by weight of the agrochemically acceptable non-aqueous liquid carrier based on the total weight of all components in the formulation, wherein the agrochemically acceptable non-aqueous liquid carrier is selected from the group consisting of aromatic hydrocarbons or alkyl esters of fatty acids, and combinations thereof; and
   (d) 1-40% by weight of the surfactant based on the total weight of all components in the formulation, wherein the surfactant is selected from the group consisting of alkyl benzene sulfonates, tristyrylphenol ethoxylates, and block copolymers,
   wherein mancozeb is suspended in the non-aqueous liquid carrier, wherein the non-aqueous liquid carrier comprises at least 10% by weight of an adjuvant based on the total weight of all components in the formulation, and
   wherein the adjuvant is selected from the group consisting of alkoxylated sorbitan esters, methyl ester of soybean oils, tall oil fatty acids, and combinations thereof.

9. The fungicidal oil liquid formulation of claim 1, wherein the triazole fungicide is tebuconazole.

10. The fungicidal oil liquid formulation of claim 1, wherein the triazole fungicide is difenoconazole.

11. The fungicidal oil liquid formulation of claim 1, wherein the triazole fungicide is prothioconazole.

12. The fungicidal oil liquid formulation of claim 1, wherein the strobilurin fungicide is trifloxystrobin or picoxystrobin.

13. The fungicidal oil liquid formulation of claim 1, wherein the non-aqueous liquid carrier comprises naphthalene, N, N-dimethyldecanamide, or a combination thereof.

14. The fungicidal oil liquid formulation of claim 1, wherein the non-aqueous liquid carrier comprises the adjuvant.

15. The fungicidal oil liquid formulation of claim 14, wherein the adjuvant in the non-aqueous liquid carrier is selected from the group consisting of vegetable oils, alkyl ester of vegetable oils, alkoxylated sorbitan esters, or a combination thereof.

16. The fungicidal oil liquid formulation of claim 15, wherein the alkoxylated sorbitan ester is selected from the group consisting of sorbitan monolaurate alkoxylates, sorbitan monostearate alkoxylates, sorbitan monooleate alkoxylates, or a combination thereof.

17. The fungicidal oil liquid formulation of claim 14, wherein the adjuvant in the non-aqueous liquid carrier is selected from the group consisting of methyl ester of soybean oil, tall oil fatty acids, polyoxyethylene (16) sorbitan monolaurate and mixtures thereof.

18. The fungicidal oil liquid formulation of claim 1, wherein the triazole fungicide is tebuconazole and the strobilurin fungicide is picoxystrobin.

19. The fungicidal oil liquid formulation of claim 1, wherein the triazole fungicide is prothioconazole and the strobilurin fungicide is picoxystrobin.

20. The fungicidal oil liquid formulation of claim 1, wherein the triazole fungicide is prothioconazole and the strobilurin fungicide is trifloxystrobin.

21. The fungicidal oil liquid formulation of claim 1, wherein the triazole fungicide is difenoconazole and the strobilurin fungicide is trifloxystrobin.

22. The fungicidal oil liquid formulation of claim 1, wherein the triazole fungicide is difenoconazole and the strobilurin fungicide is picoxystrobin.

23. The fungicidal oil liquid formulation of claim 1, wherein the triazole fungicide is cyproconazole and the strobilurin fungicide is picoxystrobin.

24. The fungicidal oil liquid formulation of claim 1, wherein the triazole fungicide is cyproconazole and the strobilurin fungicide is azoxystrobin.

25. The fungicidal oil liquid formulation of claim 1, wherein the triazole fungicide is tebuconazole and the strobilurin fungicide is azoxystrobin.

26. The fungicidal oil liquid formulation of claim 1, wherein the triazole fungicide is prothioconazole and the strobilurin fungicide is azoxystrobin.

27. A method for controlling or reducing the severity of a pest on plants or propagation material thereof comprising applying the fungicidal oil liquid formulation of claim 1 to soil, the plant, and/or the propagation material of the plant so as to thereby control or reduce the severity of the pest.

28. The method of claim 27, wherein:
(a) the fungicidal oil liquid formulation is applied at a rate of 1-5 l/ha, or
(b) the fungicidal oil liquid formulation is applied at a rate of 2-3 l/ha.

* * * * *